INVENTOR.
CHARLES J. BOYER
BY
his ATTORNEY

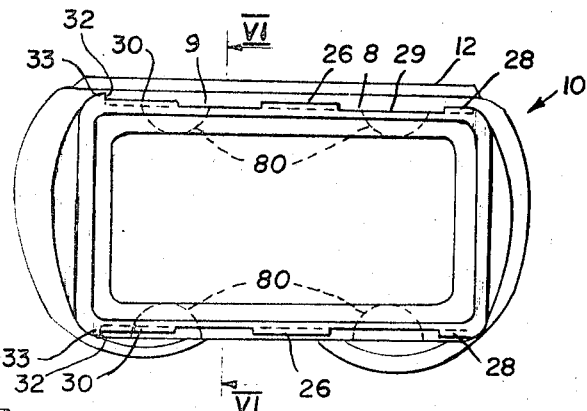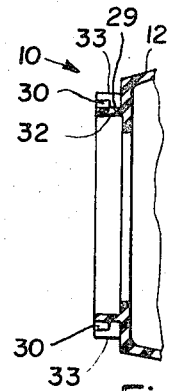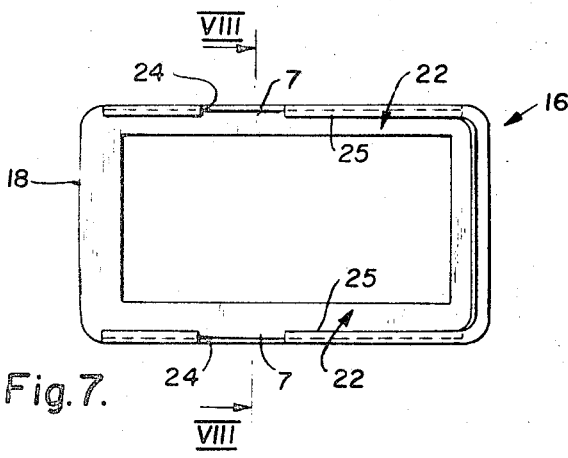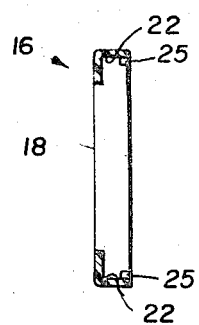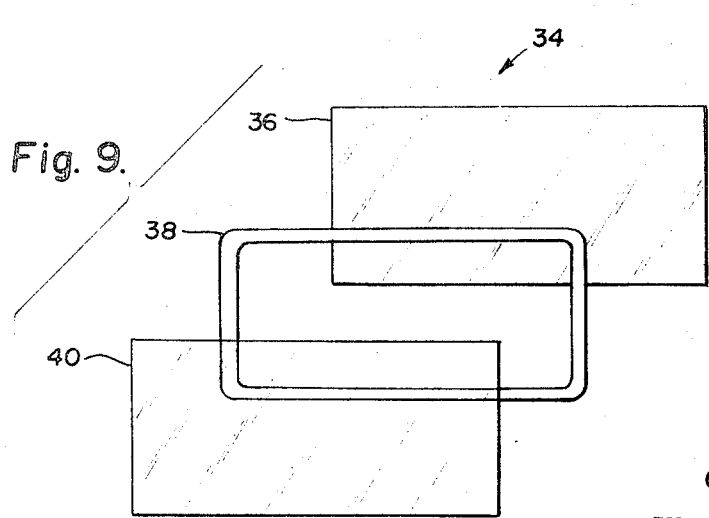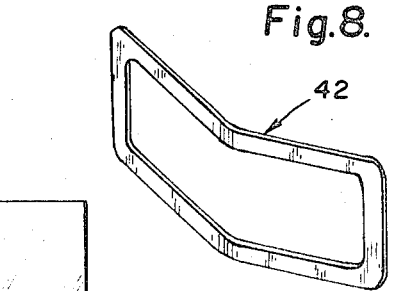

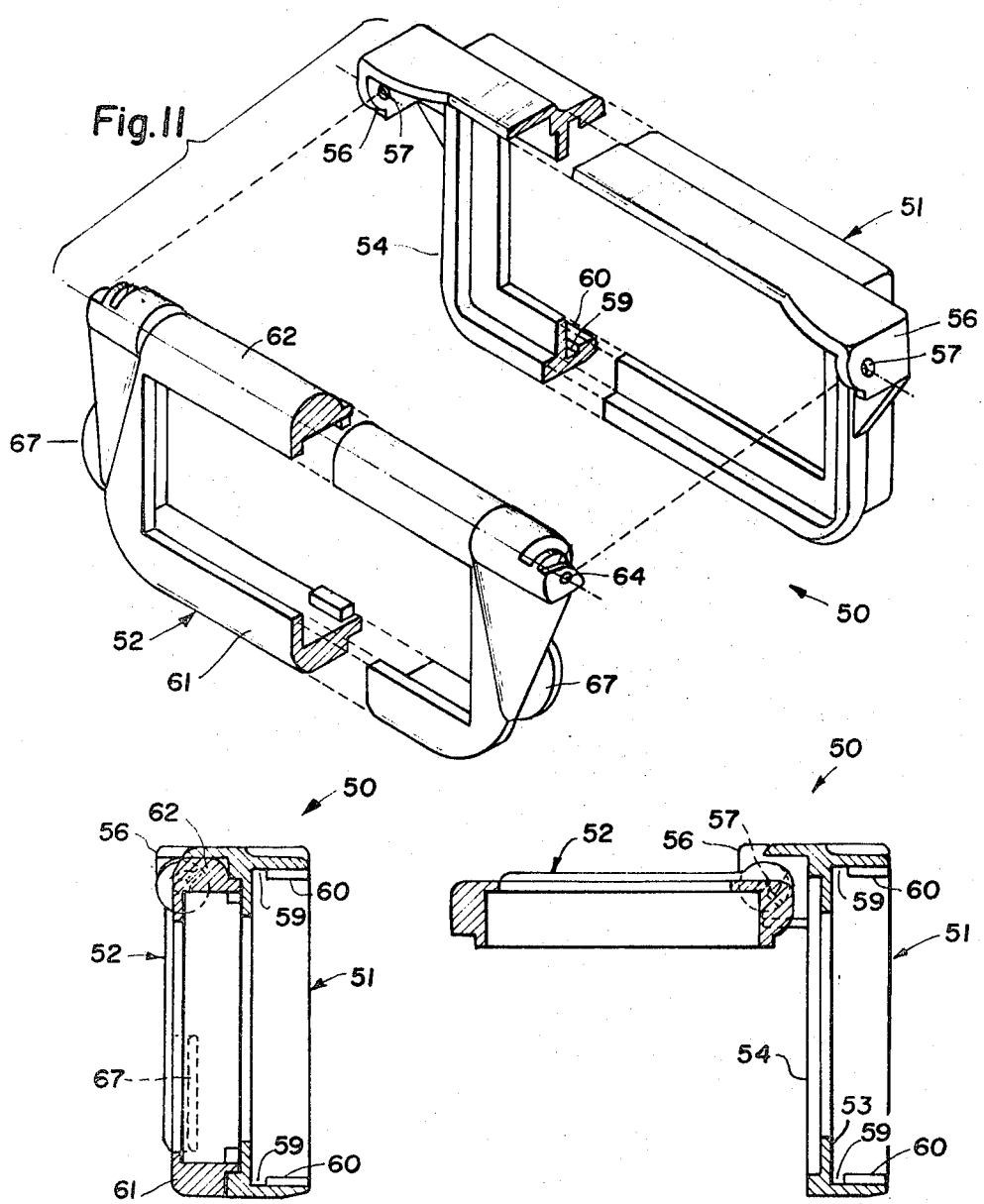

United States Patent Office 3,444,561
Patented May 20, 1969

3,444,561
WELDING GOGGLE
Charles J. Boyer, Reading, Pa., assignor to ESB
Incorporated, a corporation of Delaware
Filed June 23, 1966, Ser. No. 559,843
Int. Cl. A61f 9/02, 9/06
U.S. Cl. 2—8          5 Claims

ABSTRACT OF THE DISCLOSURE

A goggle face piece having a window opening provided with track means together with a lens retainer frame having slotted flanges engageable with the track means and arranged so that the retainer may be detachably slid onto the track means by very little sliding movement. Additional lenses may also be mounted on a flip-front, pivotally mounted, supplemental frame.

---

This invention relates to a welding goggle and, more particularly, to a readily detachable lens assembly and retainer.

The lens assembly including a transparent cover lens and translucent welding plate may be removably mounted on the face piece or eye shield by enclosing the assembly in a retainer which is slidably mounted on an integral track forwardly of the face piece. However, this has an outstanding disadvantage in that it requires the lens retainer to be moved in edge-to-edge relationship with the track to provide registry to start the sliding movement, at which time considerable difficulty is involved in holding the lens assembly in place, often times resulting in smudging of the lens in attempts to confine the assembly in the retainer, and sometimes resulting in accidental dropping and breaking of the lens.

An object of the present invention is to provide a novel lens retainer construction and assembly which will facilitate mounting of the lens assembly and retainer on the forward track of the eye shield and which requires only a very limited sliding movement of the retainer relative such track to permit very easy and quick removal of the lens assembly and replacement thereof.

Another object of the invention is to provide a novel retainer and lens assembly which may be attached to the face piece of a welding goggle and wherein a spring is held in compression even as the retainer is being slid into place, thereby eliminating the necessity of holding or otherwise handling the lens assembly as the retainer is being mounted, also whereby the lens assembly is automatically partially ejected for easy removal in response to a very small sliding movement of the retainer relative the track.

Other objects and advantages will become more apparent from a study of the following description taken with the accompanying drawings wherein:

FIG. 5 is a front view of the face piece or eye shield showing the tongues for removably holding in place the retainer which is not shown in FIG. 5 but illustrated in FIGS. 7 and 8;

FIG. 6 is a cross-sectional view taken along line VI—VI of FIG. 5;

FIG. 7 is a rear view of the retainer 16 and FIG. 8 is a cross-sectional view taken along line VIII—VIII of FIG. 7;

FIG. 9 is an exploded view of the lens assembly shown in FIGS. 1, 2 and 4;

FIG. 10 is a perspective view of the spring 42 shown in FIG. 4;

FIG. 11 is an exploded, perspective view of a modification of the lens retainer including a pivotal front frame;

FIGS. 12 and 13 are cross-sectional views of the retainer shown in FIG. 11 illustrating the frame in closed and open position, respectively.

Figure 1:
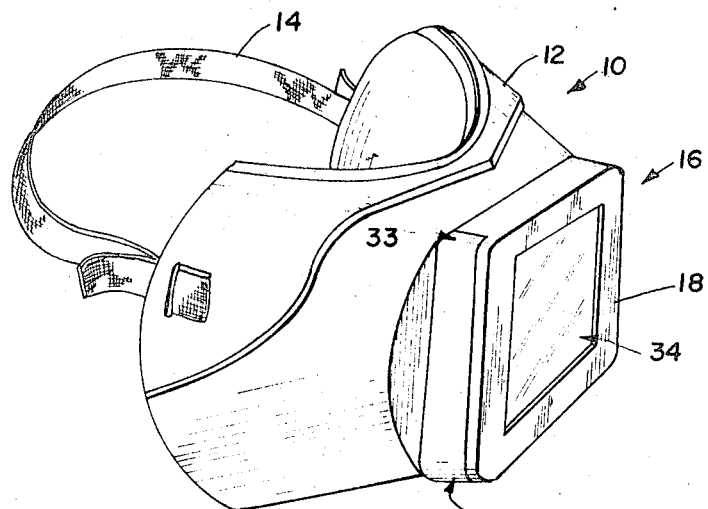
FIG. 1 is a side, perspective view of a welding goggle embodying a retainer and lens assembly in accordance with the present invention.

Referring more particularly to FIG. 1 of the drawing, numeral 10 generally denotes a welding goggle comprising a face piece or eye shield 12 of rubber, plastic or other flexible material and a headband 14. Formed about a front opening of the face piece 12, as shown more clearly in FIGS. 5 and 6, is an integral track portion 29 having integral flanges 26, 28 and 30 extending therefrom defining slots 8 and 9 therebetween. Stops 33 are provided at one end of the track portion 29 for limiting sliding movement of the retainer 16 which is mountable on such track portion.

FIGS. 7 and 8 show the construction of the retainer 16 comprising a rectangular frame 18 having top and bottom flanges 22 having depending rear flanges 24 and 25 between which are provided slots 7 in vertical alignment.

In order to mount the retainer 16 on the track portion 29 shown in FIGS. 5 and 6, the rear flanges 24 are first inserted in the slots 8 existing between flanges 26 and 28 and thereafter the retainer is slid to the left, as viewed in FIGS. 5 and 6, until the rear flanges 24 come into registry with the slots 9 between flanges 26 and 30.

Figure 3:
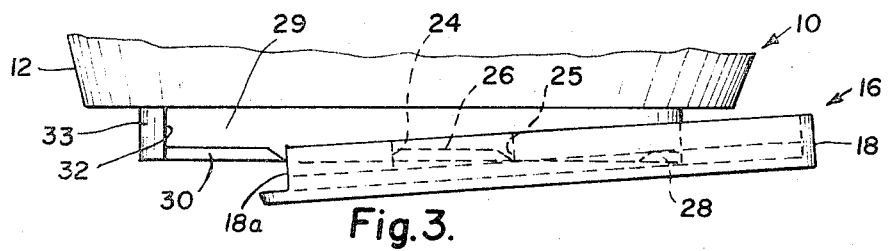
FIG. 3 is a top view of the structure shown in FIG. 2 except that the lens assembly is omitted for purposes of clarity of illustration of the relatively slidable parts.

FIG. 3 shows the resulting assembly in this position and further shows how the retainer 16 is tilted about flanges 28 as a pivot so as to pull away the left end portion of the retainer from the face piece, as shown in FIG. 3, since flanges 24 may be moved through the slots 9. At this time, spring 42 is confined in the position shown in FIG. 4. The spring has a shape more clearly shown in FIGS. 4 and 10, that is, it is of rectangular outline with a slight band or flare from the center laterally outwardly in both directions.

Figure 4:
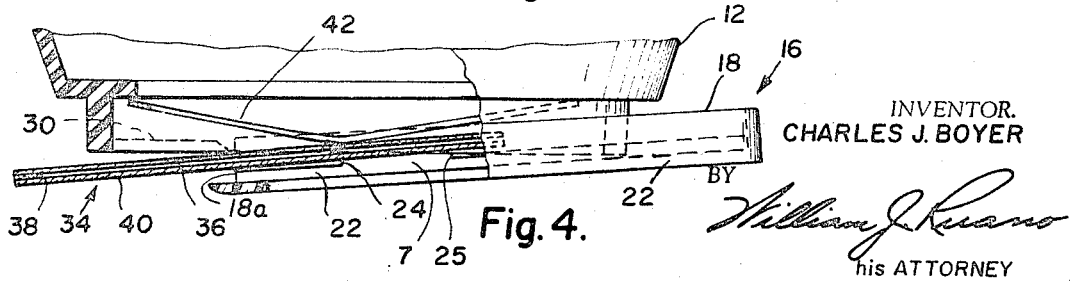
FIG. 4 is a top view, partly in cross-section, of the construction shown in FIG. 2.

Now the lens assembly 34 comprising an inner translucent plate 36, gasket 38 and transparent cover lens 40 may be slid into place in the manner illustrated in FIG. 4, since the automatic separation of the left portion of the retainer from the face piece, under the action of spring 42, provides a substantial opening into which the lens assembly may be slid from the side. As the lens assembly is slid into place it will engage the central portion of spring 42, and after the lens assembly has been fully inserted within the confines of the retainer 16, the left side of the retainer may be pushed inwardly toward the face piece compressing spring 42 as flanges 24 move through the slots 9 formed between flanges 26 and 30 and then the retainer is slid to the left, as viewed in FIGS. 2, 3 and 4, until its movement is arrested by engagement of surface 32 of stop 33 with the left edge 18a of the retainer. Such movement is of the order of 1 inch.

Figure 2:
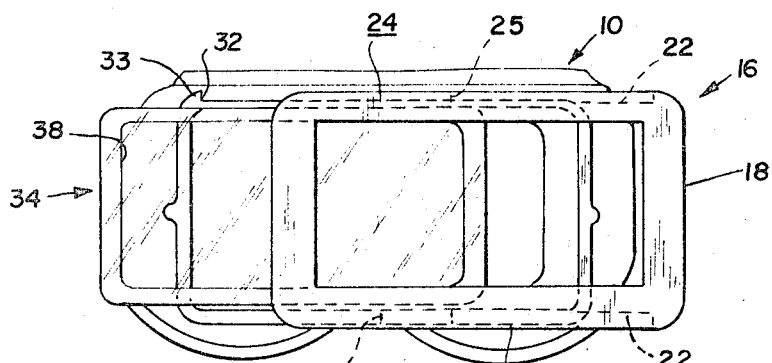
FIG. 2 is a front view of the goggle showing the position of the retainer when partially mounted on the face piece, at which position the lens assembly may be readily withdrawn or inserted in the retainer.

When it is desired to remove the lens assembly 34, the movement is in reverse, that is, the retainer 16 is moved to the right from the position shown in FIG. 1 to that shown in FIGS. 2, 3 and 4, so that by the action of spring 42, the retainer will be automatically pushed out into the position shown in FIGS. 2, 3 and 4 since flanges 24 come into registry with the slots 9 between flanges 30 and 26 so as to provide angular separation to facilitate removal of the lens assembly, as illustrated in FIG. 4, and replacement thereof with a new assembly.

Thus, after the retainer is initially mounted in position as shown in FIG. 1, it is necessary merely to slide the retainer to the right a slight amount, that is about 1 inch from the position shown in FIG. 1 to that shown in FIG. 3.

It will be readily apparent that in view of the above described construction, there is no danger of accidental dropping of the lens assembly when first mounting the retainer on the track portion since at all times the lens assembly is trapped between the retainer and face piece. It will be further noted that spring 42 need never be removed from the position shown in FIG. 4 and will provide constant compression of the lens assembly and, most important, will effect automatic ejection of the left portion of the retainer as well as the lens assembly into the position shown in FIGS. 2, 3 and 4.

It will also be noted that the lens assembly need never be held, when initially mounting the retainer, and may be easily pulled out when in the position shown in FIG. 4 merely by grasping the top and bottom edges so as to avoid smudging of the lens and plate.

FIGS. 11, 12 and 13 show a modification of the lens retainer assembly which embodies a so called "flip front" or pivotal lens retaining frame that may be pivotally lifted, whereby the welder may view objects through a second, stationarily mounted lens and frame. Numeral 50 generally denotes the modified assembly which comprises a slidably mounted, stationary frame 51 having top and bottom flanges 60 to enable sliding of the frame onto the goggle track portion 29. Numeral 59 denotes the space for receiving flange 30 as frame 51 is slid along track portion 29 to mount the assembly of FIGS. 12–13 on the mask. Numeral 54 denotes a front portion having a recess or well for receiving a correspondingly shaped rear portion of a pivotally mounted front frame 52 relative to top portion 55.

Figure 14:
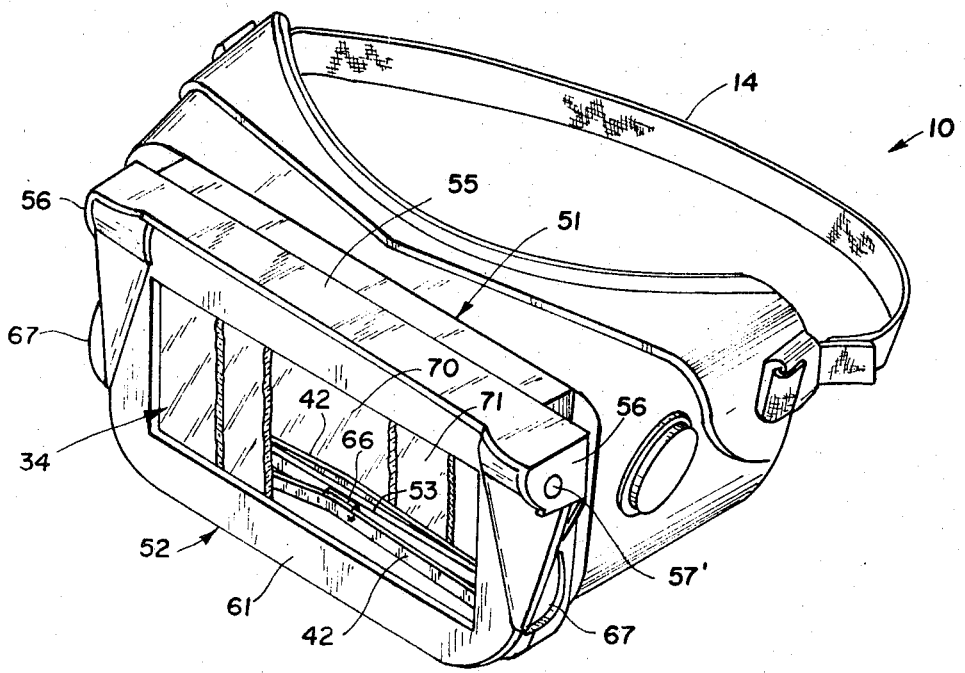
FIG. 14 is a perspective view of the entire assembly.

A dark glass lens assembly including lenses 34 (not shown in FIGS. 11–13, for more clearly showing the frame construction) is shown in FIG. 14. The pivotal mounting is in the form of a pivot pin which fits into registering holes 64 and 57. A suitably formed spring is inserted in hinge box 56 of stationary frame 51 at both ends of top cross member 62 of pivotally mounted front frame 52. Said spring provides a snap action to the hinge movement, holding frame 52 in position shown in FIG. 12 or in the position shown in FIG. 13. Tabs 67 are grasped when frame 52 is to be pivotally moved from the position shown in FIG. 12 to that shown in FIG. 13.

If desired, and in addition, clear magnifying lenses 70, 71 are mounted in the facepiece opening between integral tabs 80 (FIG. 5) along the inner surface of the facepiece surrounding the opening and the marginal ledge defining the opening of 61. A pressure spring 42 is used to retain the frame 51 in place. It is inserted inside track portion 59 and bears against the face piece lens receptacle and the clear laminated lens plate inserted in the same position as the complete lens assembly 34 when the standard retainer 16 is used. This laminated lens is used in all cases when assembly 50 is used. The magnifying lenses are used with either retainer 16 or the modified assembly 50 as an optional accessory and is dictated by the wearer's visual requirements. When the operator wishes to view the work only through the magnifying clear lenses 70, 71, he will pivotally lift the pivotal frame 52.

Thus it will be seen that I have provided an efficient lens retainer assembly for a welding goggle which eliminates the necessity of holding the lens in place when first mounting the retainer on the facepiece, and which will automatically eject an end portion of the retainer away from the face piece after very limited sliding movement to facilitate removal and replacement of the lens assembly as aided by the action of a spring permanently mounted in place; furthermore, I have provided a lens assembly which requires no handling during initial mounting of the retainer, therefore, which avoids smudging thereof.

I claim:

1. A goggle comprising a face piece for surrounding and protecting the eyes of the wearer, said face piece having a rear recess, integral flexible tabs formed on the inner surface of said face piece extending in spaced relationship along the perimeter of said opening, track means integrally secured to said face piece and extending along opposite longitudinal edges of said opening, magnifying lenses held in said recess by said flexible tabs, integral flanges extending away from said track means and having slots therebetween, a retainer comprising a rectangular frame having flanges on opposite longitudinal sides thereof terminating in depending flanges having slots therebetween arranged so that certain of said depending flanges project through said first mentioned slots, a lens assembly mounted in said retainer, said retainer being mounted on said track means for sliding movement thereon from a position where said flanges on said retainer project through said slots between said flanges on said face piece to a position where said flanges on said retainer lock behind said flanges on said face piece while said lens assembly is trapped between said retainer and face piece.

2. A goggle as recited in claim 1 together with a spring mounted within the confines of the front portion of said face piece for yieldingly applying pressure to said lens assembly, whereby when said retainer is slid slightly relative said track means to obtain registry between said certain of said depending flanges and first mentioned slots, the corresponding end portion of the retainer will be automatically tilted away from said face piece by said spring to enable easy removal of said lens assembly.

3. A goggle as recited in claim 1 wherein said retainer includes a lens retaining frame which is pivotally mounted at the top so that it may be lifted out of the line of sight of the wearer.

4. A goggle as recited in claim 2 together with a stop at one end portion of said track means for limiting sliding movement of said retainer, and a pivot at the other end portion to provide said tilting movement of said retainer.

5. A goggle as recited in claim 1 together with a second frame pivotally mounted to the top of said retainer frame, and a dark lens assembly mounted in said second frame, whereby the operator, by selectively pivoting said second frame, may look through one or both of said lens assemblies.

References Cited

UNITED STATES PATENTS

| 2,055,117 | 9/1936 | Bowers | 2—8 |
| 2,186,817 | 1/1940 | Bowers | 2—8 |
| 2,726,395 | 12/1955 | Anderson | 2—8 |
| 3,016,542 | 1/1962 | Lindblom | 2—14.9 |
| 3,212,101 | 10/1965 | Benner | 2—8 |
| 3,278,943 | 10/1966 | Manz | 2—8 |

JAMES R. BOLER, *Primary Examiner.*

U.S. Cl. X.R.

2—14